United States Patent
Stanga et al.

(10) Patent No.: US 8,263,708 B2
(45) Date of Patent: Sep. 11, 2012

(54) VULCANIZED (PER) FLUOROELASTOMER SEALING ARTICLES

(75) Inventors: Milena Stanga, Origgio (IT); Claudia Manzoni, Bologna (IT); Giovanni Comino, Monza (IT); Margherita Albano, Milan (IT)

(73) Assignee: Solvay Solexis S.p.A., Bollate Mi (IT)

( * ) Notice: Subject to any disclaimer, the term of this patent is extended or adjusted under 35 U.S.C. 154(b) by 0 days.

(21) Appl. No.: 13/132,333

(22) PCT Filed: Dec. 3, 2009

(86) PCT No.: PCT/EP2009/066376
§ 371 (c)(1),
(2), (4) Date: Jun. 2, 2011

(87) PCT Pub. No.: WO2010/063810
PCT Pub. Date: Jun. 10, 2010

(65) Prior Publication Data
US 2011/0237751 A1    Sep. 29, 2011

(30) Foreign Application Priority Data
Dec. 5, 2008  (EP) .................................... 08170815

(51) Int. Cl.
C08L 27/12 (2006.01)
C08F 214/26 (2006.01)

(52) U.S. Cl. ...................................... 525/199; 525/200

(58) Field of Classification Search ................... 525/199, 525/200
See application file for complete search history.

(56) References Cited

U.S. PATENT DOCUMENTS

| | | |
|---|---|---|
| 3,752,787 A | 8/1973 | De Brunner |
| 3,876,654 A | 4/1975 | Pattison |
| 4,035,565 A | 7/1977 | Apotheker et al. |
| 4,233,427 A | 11/1980 | Bargain et al. |
| 4,243,770 A | 1/1981 | Tatemoto et al. |
| 4,259,463 A | 3/1981 | Moggi et al. |
| 4,281,092 A | 7/1981 | Breazeale et al. |
| 4,394,489 A | 7/1983 | Aufdermarsh |
| 4,564,662 A | 1/1986 | Albin |
| 4,694,045 A | 9/1987 | Moore |
| 4,745,165 A | 5/1988 | Arcella et al. |
| 4,789,717 A | 12/1988 | Giannetti et al. |
| 4,864,006 A | 9/1989 | Giannetti et al. |
| 4,943,622 A | 7/1990 | Naraki et al. |
| 5,173,553 A | 12/1992 | Albano et al. |
| 5,447,993 A | 9/1995 | Logothetis |
| 5,523,346 A | 6/1996 | Wu |
| 5,616,648 A | 4/1997 | Wu |
| 5,767,204 A | 6/1998 | Iwa et al. |
| 5,789,489 A | 8/1998 | Coughlin et al. |
| 5,789,509 A | 8/1998 | Schmiegel |
| 6,160,053 A | 12/2000 | Enokida et al. |
| 6,500,903 B2 | 12/2002 | Wlassics et al. |
| 6,538,069 B2 | 3/2003 | Faulkner |
| 2004/0147676 A1 | 7/2004 | Irie et al. |
| 2005/0171282 A1 | 8/2005 | Park et al. |
| 2006/0041069 A1 | 2/2006 | Sumi et al. |
| 2007/0004862 A1 | 1/2007 | Park et al. |

FOREIGN PATENT DOCUMENTS

| | | |
|---|---|---|
| EP | 120462 A1 | 10/1984 |
| EP | 136596 A2 | 4/1985 |
| EP | 182299 A2 | 5/1986 |
| EP | 199138 A2 | 10/1986 |
| EP | 335705 A1 | 10/1989 |
| EP | 410351 A1 | 1/1991 |
| EP | 684277 A1 | 11/1995 |
| EP | 769520 A1 | 4/1997 |
| EP | 661304 A1 | 7/1997 |
| EP | 860436 A1 | 8/1998 |
| EP | 969027 A1 | 1/2000 |
| EP | 1031607 A1 | 8/2000 |
| IT | 981880 A1 | 2/2000 |
| WO | WO 9502634 A1 | 1/1995 |
| WO | WO 9705122 A1 | 2/1997 |
| WO | WO 0200777 A2 | 1/2002 |

OTHER PUBLICATIONS

Standard ASTM D2240, "Standard Test Method for Rubber Property—Durometer Hardness", 2002, p. 1-12; 12 pgs.
Standard ASTM D395, "Standard Test Methods for Rubber Property—Compression Set", 2003 (reapproved Nov. 28, 2008) A00596282, p. 1-6; 6 pgs.
Standard ASTM D1414, "Standard Test Methods for Rubber O-Rings", 1994 (reapproved Dec. 3, 2008) A00598958, p. 1-11; 11 pgs.

*Primary Examiner* — Nathan M Nutter
(74) *Attorney, Agent, or Firm* — Xuping Fu

(57) ABSTRACT

This invention pertains to sealing articles of vulcanized (per) fluoroelastomer compositions incorporating particles of a vinylidene fluoride (VDF) polymers having a Shore A hardness of at least 85 when determined according to ASTM D 2240 Type A Durometer method, and a compression set of less than 30%, when determined according to ASTM D395 at 200° C. for 70 h on O-ring according to ASTM D1414, and to a process for their manufacture by vulcanizing-molding and thermal post-treating at a temperature above the melting point of the VDF polymer.

12 Claims, No Drawings

VULCANIZED (PER) FLUOROELASTOMER SEALING ARTICLES

CROSS-REFERENCE TO RELATED APPLICATIONS

This application is a U.S. national stage entry under 35 U.S.C. §371 of International Application No. PCT/EP2009/066376 filed Dec. 3, 2009, which claims priority to European Application No. 08170815.8 filed Dec. 5, 2008, the whole content of this application being herein incorporated by reference for all purposes.

The present invention relates to certain vulcanized (per) fluoroelastomer sealing articles incorporating particles of thermoplastic polymer based on vinylidene fluoride (VDF).

Vulcanized (per)fluoroelastomers are materials with excellent heat-resistance and chemical-resistance characteristics, which are generally used in the manufacture of sealing articles such as oil seals, gaskets, shaft seals and O-rings in which the leaktightness, the mechanical properties and the resistance to substances such as mineral oils, hydraulic fluids, solvents or chemical agents of diverse nature must be ensured over a wide range of working temperatures, from low to high temperatures.

There is a continuing need for (per)fluoroelastomer sealing articles having improved tighness/stiffness compromise, i.e. having simultaneously increased leaktightness (as demonstrated by decreasing the compression set) and elastomeric behaviour, combined with higher hardness and improved mechanical properties (i.e. stress at break, modulus and elongation at break), these properties being maintained also after ageing at high temperatures, e.g. up to 280° C.

One of the approaches for improving stiffness and mechanical properties is the use of fillers dispersed in the (per)fluoroelastomer matrix from which said sealing articles can be obtained from. However, when the filler used is carbon black, in particular when it is used at high concentrations, a decline in the leaktightness and elongation at break properties (typical of elastic behaviour) is observed. The use of polymeric fillers, in particular based on thermoplastic polymers based on tetrafluoroethylene (TFE), has made it possible to partially overcome such drawbacks: however, the sealing properties obtained with such fillers might still remain unsatisfactory, in particular when targeting sealing articles of high hardness.

(Per)fluoroelastomer compositions using VDF-based thermoplastic polymers as filler are also known for the manufacture of sealing articles or other shaped articles.

Patent application WO 02/00777 describes fluoroelastomer compositions filled with thermoprocessible polymers of THV type (tetrafluoroethylene (TFE), hexafluoropropylene (HFP), VDF terpolymers), which are particularly suitable for manufacturing flexible pipes that show improved resistance to gasoline permeation. However, fluoroelastomers filled with such polymers have a limited modulus and stress at break; in other words, THV terpolymers are ineffective for improving the stiffness of the crosslinked fluoroelastomer. Also, no indication is given about the suitability of these materials for the manufacture of sealing articles.

Document U.S. Pat. No. 6,538,069 describes fluorinated rubber compounds filled with one or more thermoplastic PVDF polymers or copolymers for the manufacture of extruded articles such as fuel lines. Nevertheless, this document is silent about the sealing properties of such rubber compositions.

Also, US 2006/0041069 discloses fluoroelastomer compositions comprising vinylidene-fluoride based fluoroplastomer filler, which are used for manufacturing sealing articles by pre-forming the composition and irradiatiating shaped articles with γ-rays. Nevertheless, these irradiated and completely co-reticulated sealing articles, while endowed with outstanding dimensional precision thanks to their stifness, fail to provide acceptable elastomeric behaviour.

Similarly, document U.S. Pat. No. 6,160,053 discloses fluoroelastomer compositions comprising co-curable vinylidene fluoride polymer fillers for manufacturing O-ring. Nevertheless, due to the co-reticulation of the plastomer and the elastomer, materials described therein are not suitable for obtaining sealing articles simultaneously possessing appreciable hardness and still showing adequate sealing properties.

Need was thus felt for (per)fluoroelastomer sealing articles with improved sealing properties, as demonstrated by improved compression set values, combined with improved stiffness and mechanical properties, in the sense of improved modulus values and improved stress at break values combined with improved elongation at break values, even after thermal ageing at high temperatures.

One subject of the present invention is thus a sealing article comprising a vulcanized (per)fluoroelastomer composition incorporating particles of a semicrystalline thermoplastic fluoropolymer chosen from vinylidene fluoride (VDF) homopolymers and copolymers of VDF with one or more monomers containing at least one unsaturation of ethylenic type, in which the sum of the comonomers other than VDF is $\leq 15$ mol % relative to the total amount of monomers in the copolymer, the amount of semicrystalline thermoplastic fluoropolymer being between 30% and 90% by weight relative to the total weight of the (per)fluoroelastomer and of the semicrystalline thermoplastic fluoropolymer, the vulcanized compositions having a Shore A hardness of at least 85 when determined according to ASTM D 2240 Type A Durometer method, and a compression set of less than 30%, when determined according to ASTM D395 at 200° C. for 70 h on O-ring according to ASTM D1414.

A further object of the invention is a process for manufacturing said sealing article, said process comprising
 providing a (per)fluoroelastomer composition incorporating particles of a semicrystalline thermoplastic fluoropolymer chosen from VDF homopolymers and copolymers of VDF, as above detailed;
 vulcanizing-molding said composition to yield shaped preformed sealing articles, and
 thermally post-treating said shaped pre-formed sealing articles at a temperature greater than or equal to the melting point of the semicrystalline thermoplastic fluoropolymer.

The Applicant has thus found that by means of the process of the invention it is advantageously possible to obtain sealing articles possessing an advantageous compromise between stiffness and elasticity, i.e. high hardness and low compression set.

The term sealing article has its usual meaning and is intended to encompass any of a wide variety of elements used between matched parts to join said parts, generally to prevent leakage or penetration of fluids (gas or liquids).

Non limitative examples of sealing articles are notably gaskets, flange gaskets, inserts, seals, shaft seals, compression seals, oil seals, gas seals, penetration seals, piston rings, siphon traps, O-rings.

The sealing article of the invention comprises the vulcanized (per)fluoroelastomer composition as above defined, that is to say that in the final assembly of the sealing article other elements not made from said vulcanized composition might be comprised. It is nevertheless understood that the sealing article preferably constists essentially of the vulcanized (per)fluoroelastomer composition as above defined: mentioned other elements do not generally contribute nor interfere with the sealing effectiveness of the article.

It is essential for the thermoplastic polymer to be semicrystalline, i.e. for it to have an at least partially crystalline structure. In other words, the semicrystalline thermoplastic polymer generally has a heat of fusion, measured according to ASTM standard D 3418, of at least 5 J/g, preferably of at least 15 J/g and more preferably of at least 25 J/g.

The semicrystalline thermoplastic polymer used in the present invention is chosen from VDF homopolymers and copolymers of VDF with one or more comonomers containing at least one unsaturation of ethylenic type, as described above. The amount of VDF in the copolymers is preferably greater than 85 mol % and more preferably greater than 90 mol %.

The comonomers containing at least one unsaturation of ethylenic type are preferably fluorinated. These fluorinated comonomers are preferably chosen from the following:

(a) $C_2$-$C_8$ perfluoroolefins, such as tetrafluoroethylene (TFE), hexafluoropropene (HFP) and hexafluoroisobutene;

(b) $C_2$-$C_8$ hydrogenated fluoroolefins, such as vinyl fluoride (VF), trifluoroethylene (TrFE), and perfluoroalkylethylenes $CH_2$=CH—$R_f$, in which $R_f$ is a $C_1$-$C_6$ perfluoroalkyl;

(c) $C_2$-$C_8$ chloro- and/or bromo- and/or iodo-fluoroolefins, such as chlorotrifluoroethylene (CTFE);

(d) (per)fluoroalkyl vinyl ethers (PAVE) $CF_2$=$CFOR_f$, in which $R_f$ is a $C_1$-$C_6$ (per)fluoroalkyl, for example $CF_3$, $C_2F_5$ or $C_3F_7$;

(e) (per)fluorooxyalkyl vinyl ethers $CF_2$=CFOX, in which X is: a $C_1$-$C_{12}$ ((per)fluoro)-oxyalkyl containing one or more ether groups, for example perfluoro-2-propoxypropyl;

(f) (per)fluorodioxoles of formula:

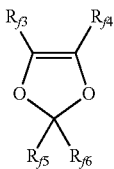

in which each of the groups $R_{f3}$, $R_{f4}$, $R_{f5}$ and $R_{f6}$, which may be identical or different from each other, is, independently, a fluorine atom or a $C_1$-$C_6$ perfluoroalkyl group optionally comprising one or more oxygen atoms, for instance —$CF_3$, —$C_2F_5$, —$C_3F_7$, —$OCF_3$, —$OCF_2CF_2OCF_3$; preferably perfluorodioxoles;

(g) (per)fluoromethoxyvinyl ethers (referred to hereinbelow as: MOVE) having the general formula:

$$CFX_2=CX_2OCF_2OR''_f \qquad (I\text{-}Ba)$$

in which $R''_f$ is chosen from linear or branched $C_1$-$C_6$ (per)fluoroalkyls; cyclic $C_5$-$C_6$ (per)fluoroalkyls; and linear or branched $C_2$-$C_6$ (per)fluorooxyalkyls, containing from one to three oxygen atoms, and $X_2$=F, H; preferably, $X_2$ is F and $R''_f$ is —$CF_2CF_3$ (MOVE1); —$CF_2CF_2OCF_3$ (MOVE2); or —$CF_3$ (MOVE3).

It is generally preferred that the semicrystalline thermoplastic fluoropolymers to be used in the sealing articles of the present invention are free from iodine and/or bromine atoms in the end position and/or in the chain of the macromolecules. Avoiding presence of these sites, co-vulcanization with the (per)fluoroelastomer can be significantly reduced, so that sealing properties and elastic behaviour of the vulcanized sealing articles are preserved.

Semicrystalline thermoplastic polymers that are particularly preferred are VDF homopolymers and VDF copolymers consisting essentially of repeating units derived from VDF and between 0.1 mol % and 15 mol % of repeating units derived from a comonomer chosen from HFP, CTFE and TrFE, and mixtures thereof.

The amount of semicrystalline thermoplastic fluoropolymer in the fluoroelastomer matrix is preferably between 30% and 80%, more preferably between 30% and 70% and even more preferably between 35% and 60% by weight relative to the total weight of the (per)fluoroelastomer and of the semicrystalline thermoplastic fluoropolymer.

Vulcanized compositions that gave particularly positive results in the sealing articles of the invention are those containing an amount of semicrystalline thermoplastic fluoropolymer of between 40% and 50% by weight relative to the total weight of the (per)fluoroelastomer and of the semicrystalline thermoplastic fluoropolymer.

The particles of semicrystalline thermoplastic fluoropolymer are generally between 10 and 500 nm and preferably between 50 and 350 nm in size.

These semicrystalline thermoplastic polymers may be obtained, for example, via a polymerization process in an aqueous microemulsion of perfluoropolyoxyalkylenes as described, for example, in patent application EP 969 027, which is incorporated herein in its entirety by reference, to obtain nanoparticles from 10 to 100 nm in size. Larger particles are obtained by polymerization of monomers in aqueous emulsion. It is also possible to use microemulsion polymerization techniques in which the oil phase consists of polymerizable unsaturated monomers, as described in U.S. Pat. No. 5,523,346 and U.S. Pat. No. 5,616,648.

The (per)fluoroelastomers used in the present invention typically belong to the following classes:

(1) VDF-based copolymers, in which VDF is copolymerized with at least one comonomer chosen from the fluorinated comonomers (a), (c), (d), (e), (f) and (g) mentioned above for the semicrystalline fluoropolymers and the following:
(h) non-fluorinated $C_2$-$C_8$ olefins (Ol), for example ethylene (E) and propylene (P);

(2) TFE-based copolymers, in which TFE is copolymerized with at least one comonomer chosen from the fluorinated comonomers (c), (d), (e) and (g) mentioned above for the semicrystalline fluoropolymers and the following:
(h) non-fluorinated $C_2$-$C_8$ olefins (Ol), for example ethylene (E) and propylene (P);
(i) perfluorovinyl ethers containing cyanide groups, as described, for example, in U.S. Pat. No. 4,281,092, U.S. Pat. No. 5,447,993 and U.S. Pat. No. 5,789,489.

Within the classes defined above, the mole composition of the (per)fluoroelastomer is preferably chosen from the following, 100% being the sum of the mole percentages of the monomers:

(a) vinylidene fluoride (VDF) 35-85%, hexafluoropropene (HFP) 10-45%, tetrafluoroethylene (TFE) 0-30%, perfluoroalkyl vinyl ether (PAVE) 0-15%, (b) vinylidene fluoride (VDF) 50-80%, perfluoroalkyl vinyl ether (PAVE) 5-50%, tetrafluoroethylene (TFE) 0-30%, (c) vinylidene fluoride (VDF) 20-30%, non-fluorinated olefins (Ol) $C_2$-$C_8$ 10-30%, hexafluoropropene (HFP) and/or perfluoroalkyl vinyl ether (PAVE) 18-27%, tetrafluoroethylene (TFE) 10-30%, (d) tetrafluoroethylene (TFE) 45-65%, non-fluorinated olefins (Ol) $C_2$-$C_8$ 20-55%, vinylidene fluoride 0-30%, (e) tetrafluoroethylene (TFE) 32-60 mol %, non-fluorinated olefins (Ol) $C_2$-$C_8$ 10-40%, perfluoroalkyl vinyl ether (PAVE) 20-40%, (per)fluoromethoxyvinyl ether (MOVE) 0-30%,
(f) tetrafluoroethylene (TFE) 33-75%, perfluoroalkyl vinyl ether (PAVE) 15-45%, vinylidene fluoride (VDF) 5-30%, hexafluoropropene HFP 0-30%,
(g) vinylidene fluoride (VDF) 35-85%, (per)fluoromethoxyvinyl ether (MOVE) 5-40%, perfluoroalkyl vinyl ether (PAVE) 0-30%, tetrafluoroethylene (TFE) 0-40%, hexafluoropropene (HFP) 0-30%.
(h) tetrafluoroethylene (TFE) 50-80%, perfluoroalkyl vinyl ether (PAVE) 20-50%;
(i) tetrafluoroethylene (TFE) 45-65%, non-fluorinated olefins (Ol) $C_2$-$C_8$ 20-55%, vinylidene fluoride 0-30%;
(l) tetrafluoroethylene (TFE) 32-60%, non-fluorinated olefins (Ol) $C_2$-$C_8$ 10-40%, perfluoroalkyl vinyl ether (PAVE) 20-40%;
(m) tetrafluoroethylene (TFE) 33-75%, perfluoroalkyl vinyl ether (PAVE) 15-45%, vinylidene fluoride (VDF) 5-30%;
(o) tetrafluoroethylene (TFE) 33-75%, perfluoroalkyl vinyl ether (PAVE) 0-45%, MOVE 15-30%, HFP 0-30%.

Optionally, the (per)fluoroelastomers also comprise monomer units derived from a bis-olefin of general formula:

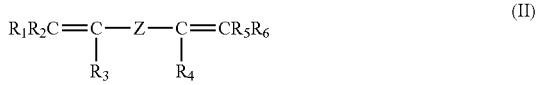

in which:
$R_1$, $R_2$, $R_3$, $R_4$, $R_5$ and $R_6$, which may be identical or different from each other, are H or $C_1$-$C_5$ alkyl;
Z is a linear or branched $C_1$-$C_{18}$ alkylene or cycloalkylene radical, optionally containing oxygen atoms, preferably at least partially fluorinated, or a (per)fluoropolyoxyalkylene radical; these bis-olefins are described, for example, in document EP 661 304 in the name of the Applicant.

The amount of chain units derived from these bis-olefins is generally between 0.01 and 1.0 mol, preferably between 0.03 and 0.5 mol and even more preferably between 0.05 and 0.2 mol % per 100 mol of the other monomer units indicated above that constitute the base structure of the fluoroelastomer.

The preparation of the fluoroelastomers of the mixture that is used for manufacturing the sealing articles of the present invention may be performed by copolymerizing the monomers in aqueous emulsion, according to methods that are well known in the art, in the presence of radical initiators (for example alkali metal or ammonium persulfates, perphosphates, perborates or percarbonates), optionally in combination with ferrous, cuprous or silver salts, or salts of other readily oxidizable metals. Surfactants of various types are usually also present in the reaction medium, among which fluorinated surfactants are more particularly preferred.

As an alternative to emulsion polymerization, the polymerization reaction to obtain the fluoroelastomers of the mixture under consideration may be performed in bulk or in suspension, in an organic liquid in which a suitable radical initiator is present, according to well-known techniques.

The polymerization reaction is generally performed at temperatures of between 25 and 150° C., at a pressure of up to 10 MPa.

The preparation of the fluoroelastomers that are the subject of the present invention is preferably performed as a microemulsion of perfluoropolyoxyalkylenes, as described in U.S. Pat. Nos. 4,789,717 and 4,864,006.

The Applicant has found that, to obtain the sealing articles of the present invention, it is essential to use a VDF-based filler as defined above. The Applicant has found, surprisingly and unexpectedly, that the use of a thermoplastic filler of this type produces fluoroelastomers with an appreciably improved compression set when compared with fluoroelastomers filled with thermoplastic fillers of the type such as commercially available PTFE or TFE copolymers. In addition, this improved compression set value is combined with improved mechanical property values (i.e. increased hardness, improved modulus and stress at break values combined with improved elongation at break values, i.e. high values of the latter parameter). In addition, this combination of properties maintains high values even after thermal ageing at high temperatures, for example up to 280° C.

The vulcanized (per)fluoroelastomer compositions comprised in the sealing article of the present invention have typically undergone an ionic, or peroxide, or mixed ionic/peroxide vulcanization. In the case of peroxide vulcanization, the fluoroelastomers preferably contain iodine and/or bromine atoms in the chain and/or in the end position of the macromolecules. The introduction of these iodine and/or bromine atoms may be performed by adding, to the reaction mixture, brominated and/or iodinated "cure-site" comonomers, such as bromo-olefins and/or iodo-olefins containing from 2 to 10 carbon atoms (as described, for example, in U.S. Pat. Nos. 4,035,565 and 4,694,045), or iodo- and/or bromo-fluoroalkyl vinyl ethers (as described in U.S. Pat. Nos. 4,745,165, 4,564,662 and EP 199 138) in amounts such that the content of "cure-site" comonomers in the final product is generally between 0.05 and 2 mol per 100 mol of the other base monomer units.

Other iodinated compounds that may be used are triiodinated triazine derivatives as described in European patent application EP 860 436 and in Italian patent application MI98A 001880.

As an alternative to or in combination with the "cure-site" comonomers, it is possible to introduce iodine and/or bromine end atoms by adding to the reaction mixture iodinated and/or brominated chain-transfer agents, for instance compounds of formula $R_f(I)_x(Br)_y$, where $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. Nos. 4,243,770 and 4,943,622). It is also possible to use as chain-transfer agents alkali metal or alkaline-earth metal iodides and/or bromides, as described in U.S. Pat. No. 5,173,553. In combination with the chain-transfer agents containing iodine and/or bromine, it is possible to use other chain-transfer agents known in the art, such as ethyl acetate, diethyl malonate, etc.

The peroxide-mediated vulcanization is performed according to known techniques, via the addition of a suitable peroxide capable of generating radicals by thermal decomposition. Among the agents most commonly used, mention may be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other peroxide systems are described, for example, in patent applications EP 136 596 and EP 410 351.

Other products may be added to the vulcanization blend, such as:
(a') vulcanization coagents, in an amount generally of between 0.5% and 10% and preferably between 1% and 7% by weight relative to the (per)fluoroelastomer; among these agents, the ones commonly used are:

triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinylmethyltrisiloxane, etc.; TAIC is particularly preferred; other preferred crosslinking agents are bis-olefins described in European patent EP 769 520. Other crosslinking agents that may be used are triazines described in documents EP 860 436 and WO 97/05122;

(b') optionally, a metallic compound, in an amount of between 1% and 15% and preferably between 2% and 10% by weight relative to the polymer, chosen from oxides and hydroxides of divalent metals, for instance Mg, Zn, Ca or Pb, optionally combined with a salt of a weak acid, for instance stearates, benzoates, carbonates, oxalates or phosphites of Ba, Na, K, Pb or Ca;

(c') optionally, acid acceptors of metal non-oxide type such as 1,8-bis(dimethylamino)naphthalene, octadecylamine, etc. as described in EP 708 797;

(d') optionally, other conventional additives, such as thickening fillers, preferably carbon black, semicrystalline fluoropolymers consisting of TFE homopolymers or copolymers of TFE with one or more monomers containing at least one unsaturation of ethylenic type, in an amount of from 0.01 mol % to 10 mol % and preferably from 0.05 mol % to 7 mol %; pigments, antioxidants, stabilizers and the like.

When the (per)fluoroelastomer matrix contains cyanide groups, the vulcanization of the fluoropolymers used for manufacturing the sealing articles of the present invention is performed using as crosslinking agents organotin compounds or diaromatic amine compounds, as described in U.S. Pat. Nos. 4,394,489, 5,767,204 and 5,789,509. This type of vulcanization may be combined with a vulcanization of peroxide type, in the case where the fluoroelastomer matrix contains iodinated and/or brominated end groups, as described in U.S. Pat. No. 5,447,993.

The ionic vulcanization is advantageously performed by adding vulcanizing agents and accelerators that are well known in the art. The amounts of accelerators are between 0.05-5 parts by weight and the vulcanizing agent between 0.5-15 parts by weight and preferably 1-6 parts by weight per 100 parts of (per)fluoroelastomer.

Vulcanizing agents that may be used include aromatic or aliphatic polyoxyhydryl compounds, or derivatives thereof, as described, for example, in EP 335 705 and U.S. Pat. No. 4,233,427. Among these agents, mention may be made in particular of di-, tri- and tetrahydroxy benzenes, naphthalenes or anthracenes; bisphenols, in which the two aromatic rings are bonded together via a divalent aliphatic, cycloaliphatic or aromatic radical, or via an oxygen or sulfur atom, or alternatively a carbonyl group. The aromatic rings may be substituted with one or more chlorine, fluorine or bromine atoms or with carbonyl, alkyl or acyl groups. Bisphenol AF is particularly preferred.

Examples of accelerators that may be used include: quaternary ammonium or phosphonium salts (see, for example, EP 335 705 and U.S. Pat. No. 3,876,654); aminophosphonium salts (see, for example, U.S. Pat. No. 4,259,463); phosphoranes (see, for example, U.S. Pat. No. 3,752,787); the imine compounds described in EP 182 299 and EP 120 462; etc. Quaternary phosphonium salts and aminophosphonium salts are preferred.

Instead of using the accelerator and the vulcanizing agent separately, it is also possible to use from 1 to 5 phr (preferably 2 to 4.5 phr) of an adduct between an accelerator and a vulcanizing agent in a mole ratio of from 1:2 to 1:5 and preferably from 1:3 to 1:5, the accelerator being one of the organic onium compounds with a positive charge, as defined above, the vulcanizing agent being chosen from the compounds indicated above, in particular di- or polyhydroxy or di- or polythiol compounds; the adduct being obtained by melting the product of reaction between the accelerator and the vulcanizing agent in the indicated mole ratios, or by melting the mixture of the 1:1 adduct supplemented with the vulcanizing agent in the indicated amounts. Optionally, an excess of accelerator relative to that contained in the adduct may also be present.

For the preparation of the adduct, the following cations are particularly preferred: 1,1-diphenyl-1-benzyl-N-diethylphosphoranamine and tetrabutylphosphonium; among the anions that are particularly preferred are bisphenol compounds in which the two aromatic rings are bonded via a divalent radical chosen from the group of perfluoroalkyls containing from 3 to 7 carbon atoms, and the OH groups are in the para position.

The preparation of the adduct is described in the European patent application in the name of the Applicant EP 684 277, which is incorporated herein in its entirety by reference.

The ionic vulcanization compound may also contain:
i) one or more inorganic-acid acceptors chosen from those known in the ionic vulcanization of vinylidene fluorine copolymers, in amounts of 1-40 parts per 100 parts of (per)fluoroelastomer;
ii) one or more basic compounds chosen from those known in the ionic vulcanization of vinylidene fluoride copolymers, in amounts of from 0.5 to 10 parts per 100 parts of (per)fluoroelastomer.

The basic compounds referred to in point ii) are commonly chosen from the group consisting of $Ca(OH)_2$, $Sr(OH)_2$, $Ba(OH)_2$ and metal salts of weak acids, for instance carbonates, benzoates, oxalates and phosphites of Ca, Sr, Ba, Na and K and mixtures of the abovementioned hydroxides with the abovementioned metal salts; among the compounds of the type i), mention may be made of MgO.

The indicated amounts of the components of the blend are relative to 100 parts by weight of (per)fluoroelastomer. As stated, other conventional additives, such as thickeners, pigments, antioxidants, stabilizers and the like, may then be added to the vulcanization mixture.

The (per)fluoroelastomer composition comprised in the sealing articles of the present invention may also be vulcanized via a mixed route combining the two types of vulcanization.

The sealing articles of the invention are manufactured by the process of the invention as above described, said process comprising:
  providing a (per)fluoroelastomer composition incorporating particles of a semicrystalline thermoplastic fluoropolymer chosen from VDF homopolymers and copolymers of VDF, as above detailed;
  vulcanizing-molding said composition to yield shaped pre-formed sealing articles; and
  thermally post-treating said shaped pre-formed sealing articles at a temperature greater than or equal to the melting point of the semicrystalline thermoplastic fluoropolymer.

The Applicant has surprisingly found that by subjecting the shaped pre-formed sealing articles described above to the thermal post-treatment step under the conditions specified above, it is possible to obtain sealing articles having an appreciably improved compression set, and at the same time having improved mechanical properties, including high hardness.

In general, the (per)fluoroelastomer compositions used in the process of the invention are molded and simultaneously vulcanized using techniques such as injection-moulding or compression-moulding, or alternatively by extrusion-moulding.

While temperature at which the vulcanizing-moulding is not particularly limited, temperatures of between about 50° C. and about 250° C. and preferably between about 100° C. and about 200° C. are generally used.

With the aim of obtaining sealing articles having since their shaped pre-formed form better tightness properties (i.e. improved compression set), it will be preferred to perform the vulcanizing-molding of the composition at a temperature not exceeding melting point of the semi-crystalline thermoplastic polymer.

This means that, in general, the temperature of the vulcanizing-molding step of this embodiment is generally lower than 160° C., preferably lower than 150° C. and more preferably lower than 140° C.

The skilled in the art will thus select the appropriate curing/vulcanization system so as to obtain appropriate curing at the selected temperature. In particular, in case of peroxide-mediated vulcanization, the selection of this vulcanization-moulding temperature will advantageously determine the choice of the peroxide to be used, so as to achieve reasonable vulcanization rate in selected conditions.

After vulcanization-moulding, the vulcanized shaped pre-formed sealing articles are subjected to a subsequent thermal post-treatment step. This treatment is generally performed in suitable heating devices, generally electric ovens or convection ovens.

The thermal post-treatment is generally performed for a time from at least two minutes to 24 hours, preferably from 30 minutes to 8 hours and more preferably from 1 hour to 8 hours. Longer post-treatment times do not modify the mechanical property values obtained operating for the mentioned times.

It is essential for the thermal post-treatment to be performed at a temperature above the melting point of the VDF-based semicrystalline thermoplastic polymers. This means that, in general, the temperature of this post-treatment is greater than 160° C., preferably greater than 170° C. and more preferably greater than 180° C.

Post-treatment temperatures that have allowed a greater improvement in the mechanical and sealing properties of (per)fluoroelastomer compositions are those of between 200 and 250° C.

As stated, the shaped pre-formed sealing articles comprising the vulcanized (per)fluoroelastomer compositions as above described when subjected to the post-treatment as mentioned above, show improved sealing properties when compared to articles made from compositions filled with TFE-based thermoplastic polymers, in which a thermal post-treatment under the same temperature conditions does not allow a consequent improvement in the properties. This phenomenon is all the more surprising since, at the post-treatment temperatures, the VDF-based thermoplastic polymer is brought to the molten state, which might possibly lead to the expulsion and exudation of this filler, with a consequent possible deterioration of the sealing.

In addition, the improvement in the compression set of the sealing articles made from the (per)fluoroelastomer compositions is combined with an improvement in the mechanical properties, in the sense of increased hardness and improved modulus values and improved stress at break values combined with improved elongation at break values, i.e. higher values for this parameter. In addition, this combination of values remains high even after thermal ageing at high temperatures, for example up to 280° C., even for times of 10 hours or more.

The present invention will be illustrated more clearly by means of the examples that follow, which are given for purely indicative purposes and do not limit the scope of the present invention.

EXAMPLE

Determination of the Hardness

Hardness was determined according to ASTM D 2240 standard following Type A Durometer method at 25° C.

Determination of the Compression Set

Compression set was determined according to ASTM D395 method B at 200° C. for 70 hours, on O-ring specimens as detailed in ASTM D1414 standard.

EXAMPLE 1

Preparation of the Composition of the Invention Containing 40% by Weight of Semicrystalline Fluoropolymer B)

a) Preparation of the latex of the semicrystalline fluoropolymer B)

The PVDF latex Hylar® 5000 produced by Solvay Solexis, with a melting point of between 156 and 160° C., was used.

b) Preparation of the latex of the fluoroelastomer A)

Into a 10 l autoclave, equipped with a stirrer operating at 545 rpm, were loaded, after evacuation, 6.5 l of demineralized water and 67 ml of a perfluoropolyoxyalkylene microemulsion obtained beforehand by mixing 14.5 ml of a perfluoropolyoxyalkylene containing acid end groups of formula:

$CF_2ClO(CF_2—CF(CF_3)O)_n(CF_2O)_mCF_2COOH$, in which n/m=10, with an average molecular weight of 600; 14.5 ml of an aqueous $NH_4OH$ solution at 30% by volume; 29 ml of demineralized water; 9 ml of Galden® D02 of formula: $CF_3O(CF_2—CF(CF_3)O)_n(CF_2O)_mCF_3$ in which n/m=20, with an average molecular weight of 450.

The autoclave was then brought to 80° C. and maintained at this temperature throughout the reaction. A mixture of monomers having the following composition (in moles) was then fed in: VDF:17%; HFP:70%; TFE:13%, so as to bring the pressure to 30 bar (3 MPa).

0.32 g of ammonium persulfate (APS) as initiator, 25 g of 1,4-diiodoperfluorobutane $(C_4F_8I_2)$ as chain-transfer agent (3 g at the start of the polymerization; 9 g after 20% conversion; 8 g after 80% conversion) and 10 g of bis-olefin of formula $CH_2=CH—(CF_2)_6—CH=CH_2$ in 20 portions of 0.5 g, for each 5% increment in the conversion, were then introduced into the autoclave.

The pressure of 30 bar was kept constant throughout the polymerization by feeding in a mixture consisting of (in moles): VDF: 50%; HFP: 25%; TFE: 25%.

After 180 minutes of reaction, corresponding to 100% conversion of the monomers, the autoclave was cooled and the latex discharged.

c) Mixing of the latices and preparation of the composition of the invention.

The latex obtained in a) was mixed with the latex prepared in b) so as to obtain an amount of semicrystalline polymer equal to 40% by weight relative to the total weight of A)+B). After mixing, the latex is coagulated with an aluminium sulfate solution (6 g of $Al_2(SO_4)_3$ per litre of latex) and dried at 90° C. in a convection oven for 16 hours. Luperco® 101 XL-45 (2,5-dimethyl-2,5-di-tert-butylperoxyhexane) was used as peroxide in the crosslinking blend.

The blend was moulded at 160° C. for 10 minutes. The manufactured products obtained by moulding were subjected to a post-treatment for 4 hours at a temperature of 230° C. The results obtained are given in Table 1.

EXAMPLE 1A

Example 1 is repeated but, in the crosslinking blend, benzoyl peroxide was used as peroxide and the moulding is performed at 130° C. for 3 minutes.

EXAMPLE 2

Preparation of the Composition of the Invention Containing 50% by Weight of Semicrystalline Fluoropolymer B)
a) Preparation of the latex of the semicrystalline fluoropolymer B)
   The PVDF latex Hylar® 5000 produced by Solvay Solexis was used, as in Example 1(a).
b) The latex as obtained in Example 1(b) was used.
c) Mixing of the latices and preparation of the composition of the invention.
   The procedure described in Example 1 is repeated, except that the content of semicrystalline fluoropolymer in the composition of the invention is equal to 50% by weight.

EXAMPLE 2A

Example 2 was repeated but, in the crosslinking blend, benzoyl peroxide was used as peroxide and the moulding is performed at 130° C. for 3 minutes.

EXAMPLE 3 COMPARATIVE

Preparation of the Fluoroelastomer Composition Containing 40% by Weight of Tetrafluoroethylene-Based Semicrystalline Fluoropolymer
a) Preparation of the latex of the semicrystalline fluoropolymer B)

Into a 10 l autoclave, equipped with a stirrer operating at 545 rpm, were charged, after evacuation, 6.5 l of demineralized water and 260 ml of a perfluoropolyoxyalkylene microemulsion having the same composition as the microemulsion used in Example 1(b).

The autoclave was then brought to 80° C. and maintained at this temperature throughout the reaction. The autoclave was brought to a pressure of 0.6 bar (0.06 MPa) with ethane and then to a pressure of 20 bar (2 MPa) with a monomer mixture consisting of 6.5 mol % of perfluoromethyl vinyl ether (PMVE) and 93.5 mol % of tetrafluoroethylene (TFE).

0.13 g of ammonium persulfate (APS) was then introduced into the autoclave as initiator. During the reaction, the pressure is maintained at 20 bar by continuously feeding in the following monomer mixture: 2 mol % of PMVE and 98% of TFE.

After 160 minutes of reaction, corresponding to 100% conversion of the monomers, the autoclave was cooled and the latex discharged.

b) Preparation of the latex of the fluoroelastomer A)
   The latex as prepared in Example 1(b) was used.
c) Mixing of the latices and preparation of the composition of the invention.
   The mixing, moulding and post-treatment were performed as described in Example 1.

EXAMPLE 4 COMPARATIVE

Preparation of the Fluoroelastomer Composition Containing 50% by Weight of Tetrafluoroethylene-Based Semicrystalline Fluoropolymer
a) Preparation of the semicrystalline fluoropolymer latex
   The latex prepared as in Example 3(a) was used.
b) Preparation of the fluoroelastomer latex A)
   The latex as prepared in Example 1(b) was used.
c) Mixing of the latices and preparation of the composition of the invention.
   The mixing, moulding and post-treatment were performed as described in Example 2.

TABLE 1

| Composition | | Ex. 1 | Ex. 1A | Ex. 2 | Ex. 2A | Ex. 3 comparative | Ex. 4 comparative |
|---|---|---|---|---|---|---|---|
| Polymer composition | | 100 | 100 | 100 | 100 | 100 | 100 |
| Drimix ® TAIC 75% | phr | 1.8 | 1.8 | 1.5 | 1.5 | 1.8 | 1.5 |
| Luperox ®101XL 45 | phr | 1.2 | — | 1.0 | — | 1.2 | 1.0 |
| Benzoyl peroxide | phr | — | 1.2 | — | 1.0 | — | — |
| Mechanical properties after moulding | | | | | | | |
| Stress at break | MPa | 16.5 | 17.2 | 17.6 | 18.2 | n.d. | n.d. |
| M100 | MPa | 11.8 | 12.5 | 16.2 | 15.5 | n.d. | n.d. |
| Elongation at break | % | 150 | 147 | 137 | 142 | n.d. | n.d. |
| Hardness | Shore A | 92 | 92 | 97 | 96 | n.d. | n.d. |
| Mechanical properties after post-cure (4 h at 230° C.) | | | | | | | |
| Stress at break | MPa | 22.4 | 23.3 | 23.7 | 24.6 | 16.2 | 16.0 |
| M100 | MPa | 13.6 | 14.8 | 17.8 | 19.4 | 6.5 | 9.9 |
| Elongation at break | % | 251 | 261 | 267 | 278 | 290 | 300 |
| Hardness | Shore A | 91 | 90 | 96 | 95 | 88 | 91 |
| Mechanical properties after thermal ageing (70 h at 250° C.) | | | | | | | |
| Stress at break | MPa | n.d. | 19.8 | n.d. | 19.3 | 14.3 | 15.1 |
| M100 | MPa | n.d | 10.5 | n.d | 13.9 | 4.2 | 5.6 |
| Elongation at break | % | n.d | 300 | n.d. | 302 | 310 | 315 |
| Hardness | Shore A | n.d | 89 | n.d. | 89 | 87 | 88 |

TABLE 1-continued

| Composition | Ex. 1 | Ex. 1A | Ex. 2 | Ex. 2A | Ex. 3 comparative | Ex. 4 comparative |
|---|---|---|---|---|---|---|
| Compression set 70 h at 200° C. | (1) 52 | (1) 45 | (1) 63 | (1) 58 | | |
| O-ring 214 (1) after moulding (2) after post-cure | (2) 27 | (2) 19 | (2) 36 | (2) 23 | (2) 62 | (2) 78 | n.d. = not determined

The invention claimed is:

1. A sealing article comprising a vulcanized (per)fluoroelastomer composition incorporating particles of a semicrystalline thermoplastic fluoropolymer chosen from vinylidene fluoride (VDF) homopolymers and copolymers of VDF with one or more monomers containing at least one unsaturation of ethylenic type, in which the sum of the comonomers other than VDF is ≦15 mol % relative to the total amount of monomers in the copolymer, the amount of semicrystalline thermoplastic fluoropolymer being between 30% and 90% by weight relative to the total weight of the (per)fluoroelastomer and of the semicrystalline thermoplastic fluoropolymer, the vulcanized composition having a Shore A hardness of at least 85 when determined according to ASTM D 2240 Type A Durometer method, and a compression set of less than 30%, when determined according to ASTM D395 at 200° C. for 70 h on O-ring according to ASTM D1414.

2. The sealing article according to claim 1, wherein the amount of semicrystalline thermoplastic fluoropolymer is between 30% and 80% by weight relative to the (per)fluoroelastomer.

3. The sealing article according to claim 1, wherein the semicrystalline thermoplastic fluoropolymer particles are between 10 and 500 nm in size.

4. The sealing article according to claim 1, wherein the semicrystalline thermoplastic polymer is a VDF homopolymer or a copolymer of VDF with one or more fluorinated comonomers selected from the group consisting of:
  (a) $C_2$-$C_8$ perfluoroolefins;
  (b) $C_2$-$C_8$ hydrogenated fluoroolefins;
  (c) $C_2$-$C_8$ chloro- and/or bromo- and/or iodo-fluoroolefins;
  (d) (per)fluoroalkyl vinyl ethers (PAVE) $CF_2$=$CFOR_f$, in which $R_f$ is a $C_1$-$C_6$ (per)fluoroalkyl;
  (e) (per)fluorooxyalkyl vinyl ethers $CF_2$=CFOX, in which X is: a $C_1$-$C_{12}$ ((per)fluoro)-oxyalkyl containing one or more ether groups;
  (f) (per)fluorodioxoles of formula:

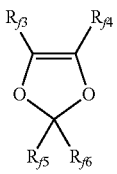

in which each of the groups $R_{f3}$, $R_{f4}$, $R_{f5}$ and $R_{f6}$, which may be identical or different from each other, is, independently, a fluorine atom or a $C_1$-$C_6$ perfluoroalkyl group optionally comprising one or more oxygen atoms; and
  (g) (per)fluromethoxyvinyl ethers (referred to hereinbelow as: MOVE) having the general formula:

$$CFX_2=CX_2OCF_2OR''_f \qquad (I-Ba)$$

in which $R''_f$ is selected from the group consisting of linear or branched $C_1$-$C_6$ (per)fluoroalkyls; cyclic $C_5$-$C_6$ (per)fluoroalkyls; and linear or branched $C_2$-$C_6$ (per)fluorooxyalkyls, containing from one to three oxygen atoms, and $X_2$ is F or H.

5. The sealing article according to claim 1, wherein the (per)fluoroelastomer is selected from the group consisting of:
  (1) VDF-based copolymers, in which VDF is copolymerized with at least one comonomer selected from the group consisting of:
    (a) $C_2$-$C_8$ perfluoroolefins;
    (b) $C_2$-$C_8$ hydrogenated fluoroolefins;
    (c) $C_2$-$C_8$ chloro- and/or bromo- and/or iodo-fluoroolefins;
    (d) (per)fluoroalkyl vinyl ethers (PAVE) $CF_2$=$CFOR_f$, in which $R_f$ is a $C_1$-$C_6$ (per)fluoroalkyl;
    (e) (per)fluorooxyalkyl vinyl ethers $CF_2$=CFOX, in which X is: a $C_1$-$C_{12}$ ((per)fluoro)-oxyalkyl containing one or more ether groups;
    (f) (per)fluorodioxoles of formula:

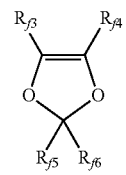

in which each of the groups $R_{f3}$, $R_{f4}$, $R_{f5}$ and $R_{f6}$, which may be identical or different from each other, is, independently, a fluorine atom or a $C_1$-$C_6$ perfluoroalkyl group optionally comprising one or more oxygen atoms;
    (g) (per)fluromethoxyvinyl ethers (referred to hereinbelow as: MOVE) having the general formula:

$$CFX_2=CX_2OCF_2OR''_f \qquad (I-Ba)$$

in which $R''_f$ is selected from the group consisting of linear or branched $C_1$-$C_6$ (per)fluoroalkyls; cyclic $C_5$-$C_6$ (per)fluoroalkyls; and linear or branched $C_2$-$C_6$ (per)fluorooxyalkyls, containing from one to three oxygen atoms, and $X_2$ is F or H; and
    (h) non-fluorinated $C_2$-$C_8$ olefins (Ol); and
  2) TFE-based copolymers, in which TFE is copolymerized with at least one comonomer selected from the group consisting of:
    (c) $C_2$-$C_8$ chloro- and/or bromo- and/or iodo-fluoroolefins;
    (d) (per)fluoroalkyl vinyl ethers (PAVE) $CF_2$=$CFOR_f$, in which $R_f$ is a $C_1$-$C_6$ (per)fluoroalkyl;
    (e) (per)fluorooxyalkyl vinyl ethers $CF_2$=CFOX, in which X is: a $C_1$-$C_{12}$ ((per)fluoro)-oxyalkyl containing one or more ether groups;
    (g) (per)fluromethoxyvinyl ethers (referred to hereinbelow as : MOVE) having the general formula:

$$CFX_2=CX_2OCF_2OR''_f \qquad (I-Ba)$$

in which $R''_f$ is selected from the group consisting of linear or branched $C_1$-$C_6$ (per)fluoroalkyls; cyclic $C_5$-$C_6$ (per)

fluoroalkyls; and linear or branched $C_2$-$C_6$ (per)fluorooxyalkyls, containing from one to three oxygen atoms, and $X_2$ is F or H;
(h) non-fluorinated $C_2$-$C_8$ olefins (Ol); and
(i) perfluoro vinyl ethers containing cyanide groups.

6. The sealing article according to claim 5, wherein the mole composition of the (per)fluoroelastomer is selected from the group consisting of, 100% being the sum of the mole percentages of the monomers:
(a) vinylidene fluoride (VDF) 35-85%, hexafluoropropene (HFP) 10-45%, tetrafluoroethylene (TFE) 0-30%, perfluoroalkyl vinyl ether (PAVE) 0-15%,
(b) vinylidene fluoride (VDF) 50-80%, perfluoroalkyl vinyl ether (PAVE) 5-50%, tetrafluoroethylene (TFE) 0-30%,
(c) vinylidene fluoride (VDF) 20-30%, non-fluorinated olefins (Ol) $C_2$-$C_8$ 10-30%, hexafluoropropene (HFP) and/or perfluoroalkyl vinyl ether (PAVE) 18-27%, tetrafluoroethylene (TFE) 10-30%,
(d) tetrafluoroethylene (TFE) 45-65%, non-fluorinated olefins (Ol) $C_2$-$C_8$ 20-55%, vinylidene fluoride 0-30%,
(e) tetrafluoroethylene (TFE) 32-60 mol %, non-fluorinated olefins (Ol) $C_2$-$C_8$ 10-40%, perfluoroalkyl vinyl ether (PAVE) 20-40%, (per)fluoromethoxyvinyl ether (MOVE) 0-30%,
(f) tetrafluoroethylene (TFE) 33-75%, perfluoroalkyl vinyl ether (PAVE) 15-45%, vinylidene fluoride (VDF) 5-30%, hexafluoropropene HFP 0-30%,
(g) vinylidene fluoride (VDF) 35-85%, (per)fluoromethoxyvinyl ether (MOVE) 5-40%, perfluoroalkyl vinyl ether (PAVE) 0-30%, tetrafluoroethylene (TFE) 0-40%, hexafluoropropene (HFP) 0-30%.
(h) tetrafluoroethylene (TFE) 50-80%, perfluoroalkyl vinyl ether (PAVE) 20-50%;
(i) tetrafluoroethylene (TFE) 45-65%, non-fluorinated olefins (Ol) $C_2$-$C_8$ 20-55%, vinylidene fluoride 0-30%;
(l) tetrafluoroethylene (TFE) 32-60%, non-fluorinated olefins (Ol) $C_2$-$C_8$ 10-40%, perfluoroalkyl vinyl ether (PAVE) 20-40%;
(m) tetrafluoroethylene (TFE) 33-75%, perfluoroalkyl vinyl ether (PAVE) 15-45%, vinylidene fluoride (VDF) 5-30%; and
(o) tetrafluoroethylene (TFE) 33-75%, perfluoroalkyl vinyl ether (PAVE) 0-45%, MOVE 15-30%, HFP 0-30%.

7. The sealing article according to claim 1, wherein the (per)fluoroelastomer comprises monomer units derived from a bis-olefin of general formula:

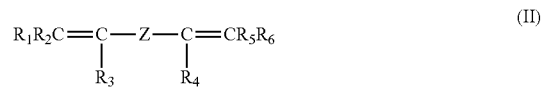

wherein:
$R_1$, $R_2$, $R_3$, $R_4$, $R_5$ and $R_6$, which may be identical or different from each other, are H or $C_1$-$C_5$ alkyls;
Z is a linear or branched $C_1$-$C_{18}$ alkylene or cycloalkylene radical, optionally containing oxygen atoms, or a (per)fluoropolyoxyalkylene radical.

8. The sealing article according to claim 7, wherein the amount of recurring units derived from the bis-olefin is between 0.01 and 1.0 mol per 100 mol of the other monomer units of the (per)fluoroelastomer.

9. A process for manufacturing the sealing article according to claim 1, said process comprising
providing a (per)fluoroelastomer composition incorporating particles of a semicrystalline thermoplastic fluoropolymer chosen from vinylidene fluoride (VDF) homopolymers and copolymers of VDF with one or more monomers containing at least one unsaturation of ethylenic type, in which the sum of the comonomers other than VDF is $\leq 15$ mol % relative to the total amount of monomers in the copolymer, the amount of semicrystalline thermoplastic fluoropolymer being between 30% and 90% by weight relative to the total weight of the (per)fluoroelastomer and of the semicrystalline thermoplastic fluoropolymer;
vulcanizing-molding said composition to yield shaped pre-formed sealing articles, and
thermally post-treating said shaped pre-formed sealing articles at a temperature greater than or equal to the melting point of the semicrystalline thermoplastic fluoropolymer.

10. The process of claim 9, said process comprising vulcanizing-molding at a temperature lower than 160° C.

11. The process of claim 9, said process comprising thermal post-treating for a time from at least two minutes to 24 hours.

12. The process of claim 9, said process comprising thermal post-treating at a temperature greater than 160° C.

* * * * *